(12) United States Patent
Ikeda et al.

(10) Patent No.: US 10,668,904 B2
(45) Date of Patent: Jun. 2, 2020

(54) DEFLECTION CONTROL APPARATUS

(71) Applicant: TOYOTA JIDOSHA KABUSHIKI KAISHA, Toyota-shi, Aichi-ken (JP)

(72) Inventors: Masayuki Ikeda, Susono (JP); Akira Nagae, Susono (JP); Ryo Inomata, Ashigarakami-gun (JP); Hironori Ito, Gotemba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 142 days.

(21) Appl. No.: 15/900,969

(22) Filed: Feb. 21, 2018

(65) Prior Publication Data

US 2018/0281762 A1 Oct. 4, 2018

(30) Foreign Application Priority Data

Apr. 4, 2017 (JP) .................................. 2017-074462

(51) Int. Cl.
*B60T 8/1755* (2006.01)
*B60T 7/12* (2006.01)
*B60T 13/66* (2006.01)

(52) U.S. Cl.
CPC ............ *B60T 8/17557* (2013.01); *B60T 7/12* (2013.01); *B60T 13/662* (2013.01); *B60T 2201/082* (2013.01); *B60T 2201/083* (2013.01)

(58) Field of Classification Search
CPC .................................................. B60T 8/17557
See application file for complete search history.

(56) References Cited

U.S. PATENT DOCUMENTS

| 7,236,870 B2* | 6/2007 | Tange | .................... B60K 31/04 348/148 |
| 7,539,566 B2* | 5/2009 | Tange | ................. B60T 8/17557 701/300 |
| 8,457,868 B2* | 6/2013 | Tange | ................... B60W 30/12 701/116 |
| 8,543,292 B2* | 9/2013 | Choi | .................... B60T 8/17557 701/41 |
| 9,604,609 B2* | 3/2017 | Elwart | ................ B60T 8/17557 |
| 10,077,048 B2* | 9/2018 | Nagae | ................. B60T 8/17557 |

(Continued)

FOREIGN PATENT DOCUMENTS

JP 2006-264686 A 10/2006
JP 4534754 B2 9/2010

*Primary Examiner* — Bao Long T Nguyen
*Assistant Examiner* — Michael A Berns
(74) *Attorney, Agent, or Firm* — Sughrue Mion, PLLC

(57) ABSTRACT

A deflection control apparatus is provided with: a determinator configured to determine whether or not a vehicle is about to depart from a driving lane; and a controller programmed to perform a deflection control for controlling a braking apparatus to supply a fluid pressure to at least one of brake mechanisms corresponding to a front wheel and a rear wheel on a side opposite to a departure direction of the vehicle. The controller is programmed to control the braking apparatus to supply the fluid pressure to the brake mechanism that is close to a fluid pressure source, out of the brake mechanisms corresponding to the front wheel and the rear wheel on the opposite side, on condition that a motion state corresponds to a regular-use area of the braking apparatus, if it is determined that the vehicle is about to depart from the driving lane.

3 Claims, 5 Drawing Sheets

(56) References Cited

U.S. PATENT DOCUMENTS

2006/0149448 A1    7/2006  Tange et al.
2018/0043870 A1*  2/2018  Nagae .................. B60T 8/17557
2018/0105152 A1*  4/2018  Nagae .................... G08G 1/167
2018/0251107 A1*  9/2018  Ito ........................ B60T 8/17557
2018/0312155 A1*  11/2018  Ito ............................. B60T 7/22

\* cited by examiner

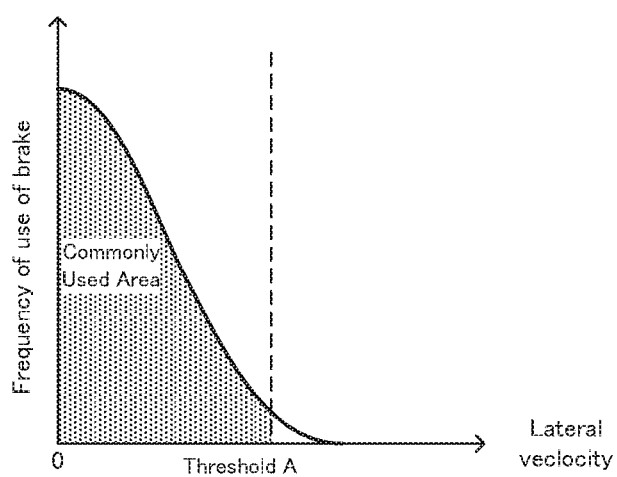
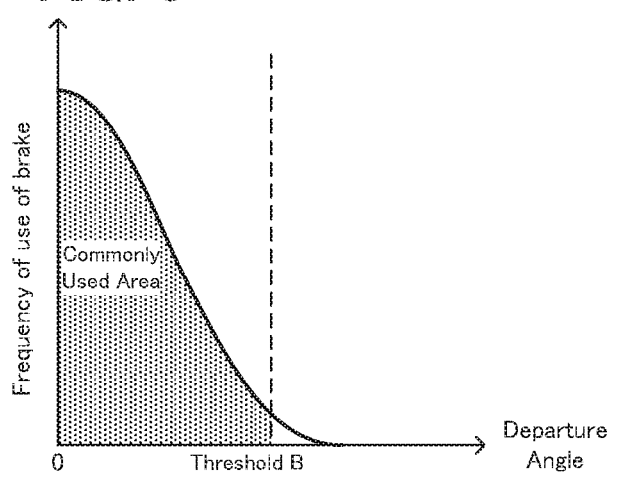

DEFLECTION CONTROL APPARATUS

CROSS-REFERENCE TO RELATED APPLICATIONS

This application is based upon and claims the benefit of priority of the prior Japanese Patent Application No. 2017-074462, filed on Apr. 4, 2017, the entire contents of which are incorporated herein by reference.

BACKGROUND

1. Technical Field

Embodiments of the present disclosure relate to a deflection control apparatus configured to deflect a vehicle, and particularly relate to a deflection control apparatus configured to deflect a vehicle by using a braking force difference between left and right wheels.

2. Description of the Related Art

For this type of apparatus, for example, there is proposed an apparatus configured to generate a yaw moment in a direction of avoiding lane departure by using a braking force difference between left and right wheels when a subject vehicle or a host vehicle is about to depart from a driving lane (refer to Japanese Patent Application Laid Open No. 2006-264686 (Patent Literature 1)).

If a braking force is applied to a wheel (or a tire), a pressure of brake fluid is transmitted to a wheel cylinder provided on the wheel via a brake pipe. At this time, a noise or sound is made due to the pressure transmitted in the brake pipe. By the way, an operation of generating the braking force difference between the left and right wheels is performed independently of a driver's will in order to avoid the departure of the subject vehicle from the driving lane. Thus, if an operating noise of a braking apparatus accompanying the operation (or particularly a noise or sound caused by the pressure transmitted in the brake pipe described above) is made, the driver possibly feels uncomfortable.

SUMMARY

In view of the aforementioned problem, it is therefore an object of embodiments of the present disclosure to provide a deflection control apparatus configured to prevent the operating noise of the braking apparatus accompanying the operation of generating the braking force difference between the left and right wheels.

The above object of embodiments of the present disclosure can be achieved by a deflection control apparatus mounted on a vehicle including a braking apparatus, wherein the braking apparatus includes a plurality of brake mechanisms and a fluid pressure source, wherein the plurality of brake mechanisms are provided for corresponding wheels and are configured to apply braking forces to the corresponding wheels due to fluid pressures supplied to the plurality of brake mechanisms, and wherein the fluid pressure source can respectively supply the fluid pressures to the plurality of brake mechanisms, the deflection control apparatus provided with: a determinator configured to determine whether or not the vehicle is about to depart from a driving lane on which the vehicle is currently running, on the basis of a position of the vehicle on the driving lane and a motion state of the vehicle; and a controller programmed to perform a deflection control for controlling the braking apparatus to supply a fluid pressure to at least one of a brake mechanism corresponding to a front wheel on a side opposite to a departure direction of the vehicle and a brake mechanism corresponding to a rear wheel on the opposite side, if it is determined that the vehicle is about to depart from the driving lane, wherein the controller is programmed to control the braking apparatus to supply the fluid pressure to the brake mechanism that is close to the fluid pressure source, out of the brake mechanism corresponding to the front wheel on the opposite side and the brake mechanism corresponding to the rear wheel on the opposite side, on condition that the motion state corresponds to a regular-use area of the braking apparatus, if it is determined that the vehicle is about to depart from the driving lane.

The "regular-use area" means an area in which a brake has a relatively high use frequency in a frequency distribution of a use frequency of the brake by the deflection control (i.e., a frequency at which the braking force is applied to the vehicle by the braking apparatus in the deflection control) with respect to a physical quantity indicating the motion state of the vehicle (in other words, in a probability distribution of use of the brake with respect to the physical quantity indicating the motion state of the vehicle).

According to studies by the present inventors, it has been found that if the motion state of the vehicle corresponds to the regular-use area of the braking apparatus, the departure of the vehicle from the driving lane can be sufficiently prevented by applying the braking force to the front wheel or the rear wheel on the side opposite to the departure direction of the vehicle.

Thus, on the deflection control apparatus, the controller is programmed to control the braking apparatus to supply the fluid pressure to the brake mechanism that is close to the fluid pressure source (e.g., a brake actuator), out of the brake mechanism (corresponding to the aforementioned wheel cylinder) corresponding to the front wheel on the side opposite to the departure direction and the brake mechanism corresponding to the rear wheel on the opposite side, on condition that the motion state corresponds to the regular-use area of the braking apparatus, if it is determined that the vehicle is about to depart from the driving lane. By virtue of such a configuration, upon implementation of the deflection control, the operating noise of the braking apparatus accompanying the deflection control can be more prevented, in comparison with when the fluid pressure is supplied to the brake mechanism that is far from the fluid pressure source. The reason is as follows. If the fluid pressure is supplied to the brake mechanism that is far from the fluid pressure source, the fluid pressure is supplied to the brake mechanism, for example, via a brake pipe arranged under an occupant compartment or a passenger compartment of the vehicle. The noise or sound caused by the fluid pressure transmitted in the brake pipe is not made if the fluid pressure is not supplied to the brake mechanism that is far from the fluid pressure source.

In one aspect of the deflection control apparatus according to embodiments of the present disclosure, the controller is programmed to determine that the motion state corresponds to the regular-use area if a lateral velocity of the vehicle which is the motion state, is less than or equal to a first predetermined value. Alternatively, in another aspect of the deflection control apparatus according to embodiments of the present disclosure, the controller is programmed to determine that the motion state corresponds to the regular-use area if a departure angle of the vehicle, which is the motion state when it is determined that the vehicle is about to depart from the driving lane, is less than or equal to a second predetermined value, which varies depending on a velocity of the vehicle.

According to those aspects, it is possible to relatively easily determine whether or not the motion state of the vehicle corresponds to the regular-use area of the braking apparatus. The "departure angle of the vehicle" means an angle made by a longitudinal direction axis of the vehicle and a direction of extending the driving lane.

The nature, utility, and further features of this disclosure will be more clearly apparent from the following detailed description with reference to embodiments of the disclosure when read in conjunction with the accompanying drawings briefly described below.

BRIEF DESCRIPTION OF THE DRAWINGS

FIG. 4 is a diagram illustrating an example of a distribution of a use frequency of a brake by a departure avoidance control with respect to a lateral velocity of the vehicle;

FIG. 5 is a diagram illustrating an example of the distribution of the use frequency of the brake by the departure avoidance control with respect to a departure angle of the vehicle;

DETAILED DESCRIPTION OF THE EMBODIMENTS

A deflect control apparatus according to embodiments of the present disclosure will be explained with reference to FIG. 1 to FIG. 7. In the following embodiments, a vehicle equipped with the deflect control apparatus according to embodiments of the present disclosure is used for explanation.

(Configuration of Vehicle)

Figure 1:
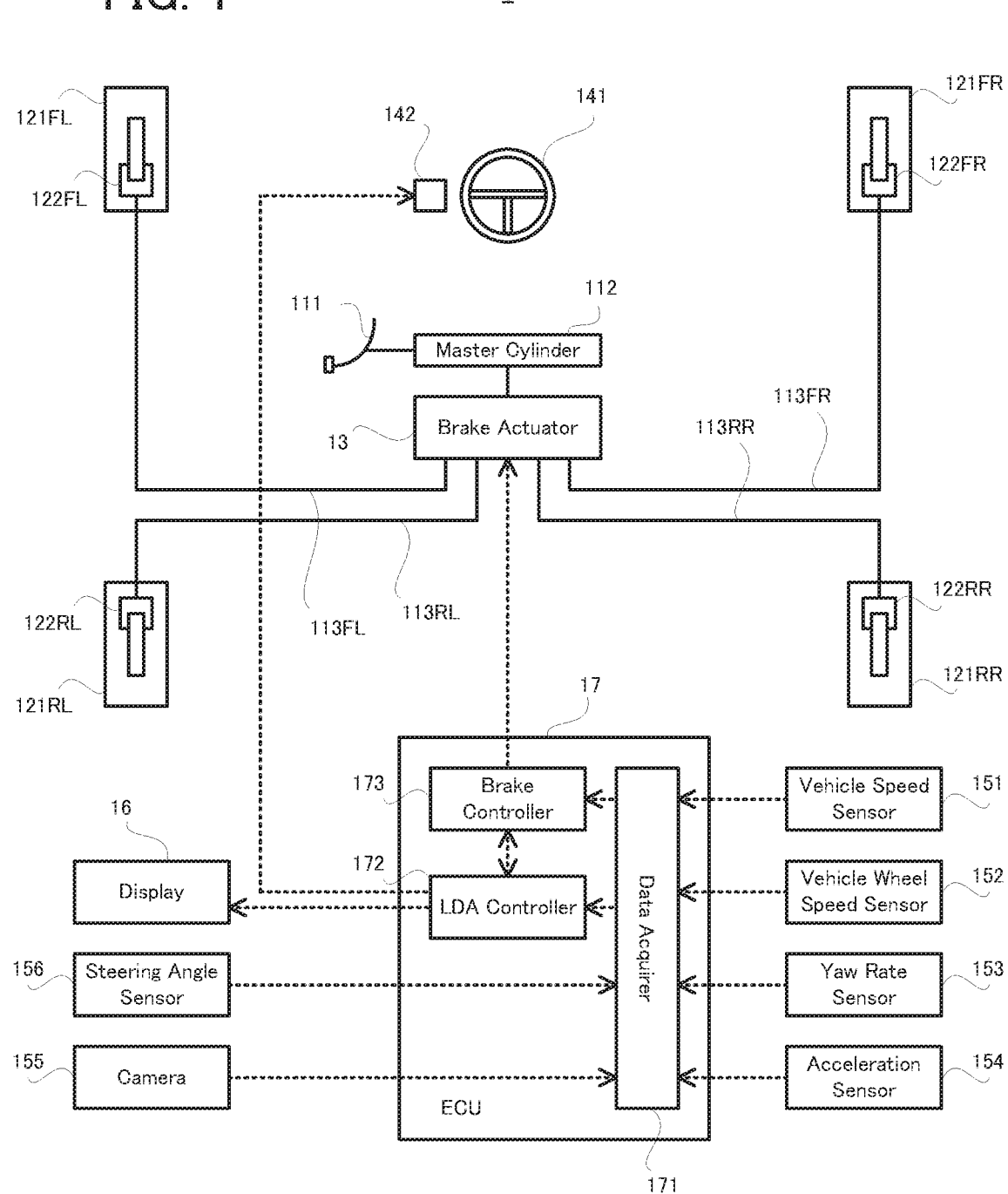
FIG. 1 is a block diagram illustrating a configuration of a vehicle according to an embodiment.

A configuration of a vehicle 1 equipped with the deflection control apparatus according to the embodiment will be explained with reference to FIG. 1. FIG. 1 is a block diagram illustrating the configuration of the vehicle 1 according to the embodiment.

In FIG. 1, the vehicle 1 is provided with a brake pedal 111, a master cylinder 112, a brake actuator 13, a wheel cylinder 122FL provided on a front left wheel 121FL, a wheel cylinder 122RL provided on a rear left wheel 121RL, a wheel cylinder 122FR provided on a front right wheel 121FR, a wheel cylinder 122RR provided on a rear right wheel 121RR, and brake pipes 113FL, 113RL, 113FR, and 113RR. The brake actuator is a specific example of the "fluid pressure source". The wheel cylinders 122FL, 122FR, 122RL, and 122RR are a specific example of the "brake mechanism".

The vehicle 1 is further provided with a steering wheel 141, a vibration actuator 142, a vehicle speed sensor 151, a vehicle wheel speed sensor 152, a yaw rate sensor 153, an acceleration sensor 154, a camera 155, a steering angle sensor 156, a display 16, and an electronic control unit (ECU) 17, which is a specific example of the "deflection control apparatus".

The master cylinder 112 is configured to adjust a pressure of brake fluid (or any fluid) in the master cylinder 112 in accordance with a step amount of the brake pedal 111. The pressure of the brake fluid in the master cylinder 112 is transmitted to the wheel cylinders 122FL, 122RL, 122FR, and 122RR respectively via the brake pipes 113FL, 113RL, 113FR, and 113RR. As a result, braking forces corresponding to pressures of the brake fluid transmitted to the wheel cylinders 122FL, 122RL, 122FR, and 122RR are respectively applied to the front left wheel 121FL, the rear left wheel 121RL, the front right wheel 121FR, and the rear right wheel 121RR.

The brake actuator 13 is configured to adjust the pressure of the brake fluid transmitted to each of the wheel cylinders 122FL, 122RL, 122FR, and 122RR, independently of the step amount of the brake pedal 111, under control of the ECU 17. Therefore, the brake actuator 13 is configured to adjust the braking force applied to each of the front left wheel 121FL, the rear left wheel 121RL, the front right wheel 121FR, and the rear right wheel 121RR, independently of the step amount of the brake pedal 111.

The steering wheel 141 is an operator operated by a driver to steer the vehicle 1 (i.e., to turn wheels to be steered or turned). The vibration actuator 142 is configured to vibrate the steering wheel 141, under the control of the ECU 17.

The ECU 17 is programmed or configured to control the entire operation of the vehicle 1. Particularly in the embodiment, the ECU 17 is configured to perform a lane departure preventing operation for preventing the vehicle 1 from departing from a driving lane on which the vehicle 1 is currently running. The ECU 17 is configured to function as a control apparatus for realizing so-called lane departure alert (LDA) or lane departure prevention (LDP).

In order to perform the lane departure preventing operation, the ECU 17 is provided with a data acquirer 171, a LDA controller 172, and a brake controller 173, as processing blocks logically realized, or processing circuits physically realized inside the ECU 17. The lane departure preventing operation according to the embodiment is an operation of generating a braking force difference between left and right wheels by applying the braking force to the wheel on one of the left and right sides of the vehicle 1 when the vehicle 1 is about to depart from the driving lane, and of applying to the vehicle 1 a yaw moment in a direction of avoiding lane departure (the details of which will be described later).

Figure 2:
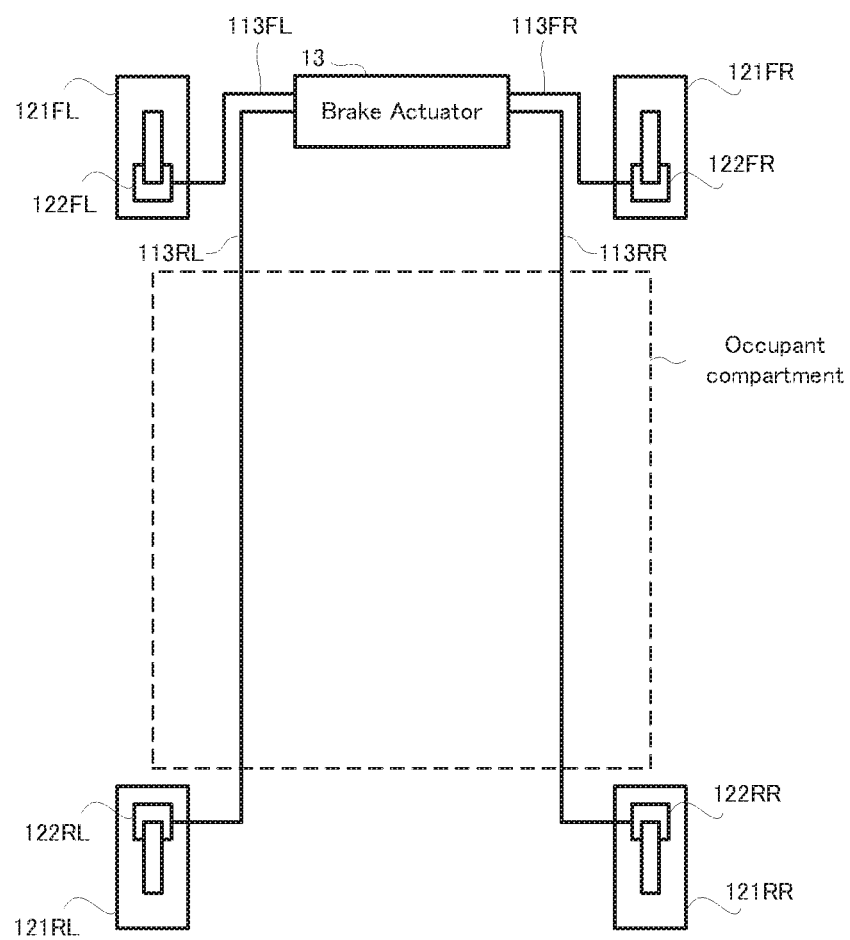
FIG. 2 is a diagram illustrating a positional relation between a vehicle interior and each brake pipe in the vehicle according to the embodiment.

Here, the brake pipes 113FL, 113RL, 113FR, and 113RR will be explained with reference to FIG. 2.

It is assumed that the brake actuator 13 is disposed on a front wheel side in the vehicle 1. In this case, as illustrated in FIG. 2, the brake pipes 113RL and 113RR are partially arranged under an occupant compartment or a passenger compartment.

For example, if the braking force is applied to the rear left wheel 121RL, the pressure of the brake fluid is transmitted to the wheel cylinder 122RL through the brake pipe 113RL. At this time, the pressure transmitted in the brake pipe 113RL causes a noise or sound. This noise is relatively likely recognized by an occupant, such as a driver of the vehicle 1, because the brake pipe 113RL is placed under the occupant compartment.

On the other hand, if the braking force is applied to the front left wheel 121FL, the pressure of the brake fluid is transmitted to the wheel cylinder 122FL through the brake pipe 113FL, which is not placed under the occupant compartment. Thus, a noise or sound caused by the pressure transmitted in the brake pipe 113FL is not recognized (or is hardly recognized) by the occupant of the vehicle 1.

The lane departure preventing operation is performed independently of an intention of the driver of the vehicle 1. Thus, if no measures are taken, the occupant of the vehicle 1 possibly feels uncomfortable due to the noise caused by the pressure transmitted in the brake pipe 113RL or 113RR when the lane departure preventing operation causes the braking force difference between the left and right wheels. The embodiment is thus configured to prevent the occupant of the vehicle 1 from feeling uncomfortable due to the lane departure preventing operation by not applying the braking force to the rear left wheel 121RL and the rear right wheel 121RR as much as possible if the lane departure preventing operation causes the braking force difference between the left and right wheels.

(Lane Departure Preventing Operation).

Next, the lane departure preventing operation according to the embodiment will be explained with reference to a flowchart in FIG. 3.

Figure 3:
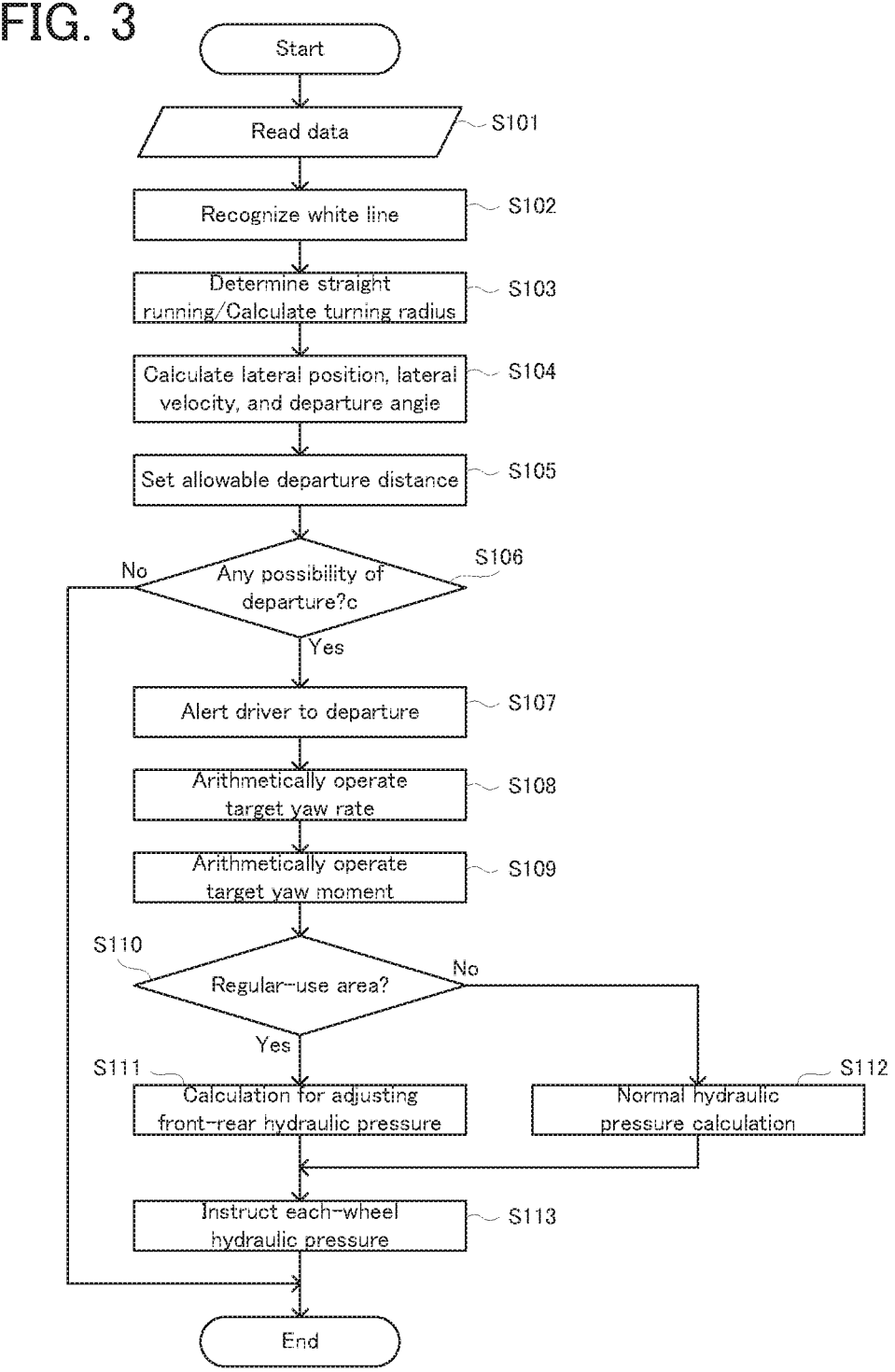
FIG. 3 is a flowchart illustrating a lane departure preventing operation according to the embodiment.

In FIG. 3, firstly, the data acquirer 171 obtains detection data indicating detection results of the vehicle speed sensor 151, the vehicle wheel speed sensor 152, the yaw rate sensor 153, the acceleration sensor 154, and the steering angle sensor 156, and image data indicating images taken by the camera 155 (step S101).

The LDA controller 172 analyzes the image data obtained in the step S101, thereby specifying a lane edge of the driving lane on which the vehicle 1 is currently running (or a "white line" disclosed in the embodiment as an example of the lane edge) in the images taken by the camera 155 (step S102). A detailed explanation of a method of recognizing the white line will be omitted because the existing technique/technology can be applied to the method.

The LDA controller 172 determines whether or not the driving lane on which the vehicle 1 is currently running is a straight lane or a curve, on the basis of the white line specified in the step S102, and calculates a curvature radius of the driving lane if the driving lane is determined to be the curve (step S103). The curvature radius of the driving lane is substantially equivalent to a curvature radius of the white line. Thus, the LDA controller 172 may calculate the curvature radius of the white line specified in the step S102 and may treat the calculated curvature radius as the curvature radius of the driving lane.

The LDA controller 172 further calculates a current lateral position, a current lateral velocity, and a current departure angle of the vehicle 1, on the basis of the white line specified in the step S102 (step S104). Here, the "lateral position" means a distance from the center of the driving lane to the vehicle 1 (or typically, a distance to the center of the vehicle 1) in a lane width direction, which is orthogonal to a direction in which the driving lane extends (or a lane extension direction). The "lateral velocity" means a velocity of the vehicle 1 in the lane width direction. The "departure angle" means an angle made by the driving lane and a longitudinal direction axis of the vehicle 1 (i.e., an angle made by the white line and the longitudinal direction axis of the vehicle 1).

The LDA controller 172 further sets an allowable departure distance (step S105). The allowable departure distance indicates an allowable maximum value of a departure distance of the vehicle 1 from the driving lane (i.e. a departure distance of the vehicle 1 from the white line) when the vehicle 1 departs from the driving lane.

For example, the allowable departure distance may be set in the following manner; namely, the LDA controller 172 may set the allowable departure distance from the viewpoint of satisfying requirements of law and regulations (e.g., requirements of new car assessment programme (NCAP)). A method of setting the allowable departure distance is not limited to this example.

Then, the LDA controller 172 determines whether or not there is a possibility that the vehicle 1 departs from the driving lane on which the vehicle 1 is currently running (i.e. whether or not the vehicle 1 is about to depart) (step S106). Specifically, for example, the LDA controller 172 may calculate a future position (e.g., in several to several ten seconds) of the vehicle 1, on the basis of a current velocity, the current lateral position, the current lateral velocity, or the like of the vehicle 1. Then, the LDA controller 172 may determine whether or not the vehicle 1 goes across or is on the white line in the future position. If it is determined that the vehicle 1 goes across or is on the white line in the future position, the LDA controller 172 may determine that there is the possibility that the vehicle 1 departs from the driving lane.

In the determination in the step S106, if it is determined that there is no possibility that the vehicle 1 departs from the driving lane (the step S106: No), the lane departure preventing operation illustrated in FIG. 3 is ended. Then, the LDA controller 172 may restart the lane departure preventing operation illustrated in FIG. 3 after a lapse of a predetermined period (e.g., several milliseconds to several ten milliseconds). In other words, the lane departure preventing operation illustrated in FIG. 3 may be repeated with a period corresponding to the predetermined period.

On the other hand, in the determination in the step S106, if it is determined that there is the possibility that the vehicle 1 departs from the driving lane (the step S106: Yes), the LDA controller 172 alerts the driver of the vehicle 1 to the possibility of the departure of the vehicle 1 from the driving lane (step S107). Specifically, the LDA controller 172 may control the display 16, for example, to display an image indicating the possibility of the departure of the vehicle 1 from the driving lane, and/or may control the vibration actuator 142 to inform the driver of the possibility of the departure of the vehicle 1 from the driving lane by using the vibration of the steering wheel 141.

In parallel with the step S107, the LDS controller 172 performs a departure avoidance control (steps S108 to S113). At this time, the LDA controller 172 may turn on a flag associated with the departure avoidance control. Here, the departure avoidance control is a control in which a yaw moment in a direction of avoiding the departure is applied to the vehicle 1 so that the departure distance of the vehicle 1 from the driving lane is within the allowable departure distance. The "departure avoidance control" according to the embodiment is an example of the "deflection control" according to embodiments of the present disclosure.

In the departure avoidance control according to the embodiment, the braking force may be applied to at least one of the front left wheel 121FL, the rear left wheel 121RL, the front right wheel 121FR, and the rear right wheel 121RR so that there is the braking force difference between the left and right wheels. As a result, the yaw moment in the direction of avoiding the departure may be applied to the vehicle 1. Hereinafter, the departure avoidance control will be specifically explained.

The LDA controller 172 arithmetically operates a target yaw rate so that the vehicle 1, which is leaving from the center of the driving lane, runs along a target track that is directed to the center of the driving lane (i.e., a traveling line to be targeted) (step S108).

The LDA controller 172 then calculates a yaw moment to be applied to the vehicle 1 as a target yaw moment, in order to generate the target yaw rate in the vehicle 1 (step S109). For example, the LDA controller 172 may calculate the target yaw moment by converting the target yaw rate to the target yaw moment on the basis of a predetermined transfer function. The LDA controller 172 transmits a signal indicating the calculated target yaw moment to the brake controller 173.

The brake controller 173 determines whether or not a motion state of the vehicle 1 corresponds to a regular-use area of a braking apparatus, on condition that the brake controller 173 receives the signal indicating the target yaw moment from the LDA controller 172 (step S110).

The regular-use area of the braking apparatus means an area in which a brake (i.e., the braking apparatus) has a relatively high use frequency in a distribution of the use frequency (i.e., a frequency distribution) of the brake by the departure avoidance control with respect to a physical quantity indicating the motion state of the vehicle 1. In other words, it can be said that the regular-use area is a range of the physical quantity indicating the motion state of the vehicle 1 in which the departure avoidance control is relatively likely performed.

Now, the "regular-use area" will be explained with reference to FIG. 4 and FIG. 5. For the physical quantity indicating the motion state of the vehicle 1, any physical quantity that has a correlation with the use frequency of the brake may be used. In the embodiment, the lateral velocity and the departure angle are specifically exemplified, and they are related to the departure from the driving lane.

FIG. 4 is a diagram illustrating an example of the distribution of the use frequency of the brake by the departure avoidance control with respect to an absolute value of the lateral velocity, which is the physical quantity indicating the motion state of the vehicle 1. FIG. 5 is a diagram illustrating an example of the distribution of the use frequency of the brake by the departure avoidance control with respect to the departure angle, which is the physical quantity indicating the motion state of the vehicle 1.

When the departure avoidance control is performed, the driver of the vehicle 1 often does not recognize that a moving direction of the vehicle 1 (i.e., the longitudinal direction axis) is deviating from the lane extension direction until the driver is alerted to the possibility of the departure of the vehicle 1 from the driving lane. Conversely, if the moving direction of the vehicle 1 is deviating from the lane extension direction, it is considered that the driver of the vehicle 1 will correct a posture of the vehicle 1 by operating the steering wheel 141 before the departure avoidance control. Thus, it can be said that the departure avoidance control is often performed if the deviation of the moving direction of the vehicle 1 from the lane extension direction is relatively small.

By the way, the "departure angle" is, as described above, an angle made by the driving lane and the longitudinal direction axis of the vehicle 1. Therefore, it can be said that the departure avoidance control is often performed if the departure angle is relatively small. Moreover, the "lateral velocity" is, as described above, a velocity or speed of the vehicle 1 in the lane width direction. The "lateral velocity" can be obtained from the velocity of the vehicle 1 and the departure angle. Therefore, it can be said that the departure avoidance control is often performed when the lateral velocity is relatively low (i.e., when the departure angle is relatively small).

For those reasons, the distribution of the use frequency of the brake as illustrated in FIG. 4 is obtained, wherein the distribution indicates that the brake has a relatively high use frequency when the vehicle 1 has a relatively low lateral velocity, and that the brake has a relatively low use frequency when the vehicle 1 has a relatively high lateral velocity. In the same manner, the distribution of the use frequency of the brake as illustrated in FIG. 5 is obtained, wherein the distribution indicates that the brake has a relatively high use frequency when the vehicle 1 has a relatively small departure angle, and that the brake has a relatively low use frequency when the vehicle 1 has a relatively large departure angle of the vehicle 1.

In the distribution of the use frequency of the brake as illustrated in FIG. 4, for example, a range of the lateral velocity including 90% of all the frequencies (i.e., a total number of samples) is defined as the regular-use area of the braking apparatus. In the distribution of the use frequency of the brake as illustrated in FIG. 5, for example, a range of the departure angle including 90% of all the frequencies is defined as the regular-use area of the braking apparatus.

In the step S110 in FIG. 3, the determination may be performed, for example, as follows.

(i) If the regular-use area of the braking apparatus is defined by the distribution of the use frequency of the brake with respect to the absolute value of the lateral velocity of the vehicle 1, the brake controller 173 may determine, in the determination in the step S110, that the motion state of the vehicle 1 (which is herein the lateral velocity) corresponds to the regular-use area of the braking apparatus, on condition that the absolute value of the lateral velocity of the vehicle 1 is less than or equal to a threshold value A (i.e., an upper limit value of a range of the absolute value of the lateral velocity corresponding to the regular-use area).

(ii) If the regular-use area of the braking apparatus is defined by the distribution of the use frequency of the brake with respect to the departure angle of the vehicle 1, the brake controller 173 may determine, in the determination in the step S110, that the motion state of the vehicle 1 (which is herein the departure angle) corresponds to the regular-use area of the braking apparatus, on condition that the departure angle of the vehicle 1 is less than or equal to a threshold value B (i.e., an upper limit value of a range of the departure angle corresponding to the regular-use area). The distribution of the use frequency of the brake with respect to the departure angle of the lateral velocity of the vehicle 1, however, varies depending on the velocity or speed of the vehicle 1. Thus, the threshold value B also varies depending on the velocity or speed of the vehicle 1.

The regular-use area of the braking apparatus may be set, as occasion demands, in accordance with e.g., specifications of the vehicle 1 or the like. In other words, the threshold value A and the threshold value B may be set, as occasion demands, in accordance with e.g., specifications of the vehicle 1 or the like.

In the determination in the step S110, if it is determined that the motion state of the vehicle 1 corresponds to the regular-use area of the braking apparatus (the step S110: Yes), the brake controller 173 calculates a pressure command value for designating the pressure of the brake fluid required to generate the target yaw moment, which is indicated by the signal from the LDA controller 172 (step S111). At this time, the brake controller 173 may calculate the pressure command value that allows the braking force to be applied only to the front wheel that is close to the brake actuator 13, out of the front and rear wheels on the side opposite to a departure direction of the vehicle 1.

The braking controller 173 then controls the brake actuator 13 on the basis of the pressure command value (step S113). In the determination in the step S110, if it is determined that the motion state of the vehicle 1 corresponds to the regular-use area of the braking apparatus, the pressure of the brake fluid according to the pressure command value is supplied to the wheel cylinder 122FL or 122FR corresponding to the front left wheel 121FL or the front right wheel 121FR. As a result, the yaw moment in the direction of avoiding the departure is applied to the vehicle 1 due to the braking force difference between the left and right wheels.

In the determination in the step S110, if it is determined that the motion state of the vehicle 1 does not correspond to the regular-use area of the braking apparatus (the step S110: No), the brake controller 173 calculates the pressure command value for designating the pressure of the brake fluid required to generate the target yaw moment, which is indicated by the signal from the LDA controller 172 (step S112). At this time, the brake controller 173 may calculate the pressure command value that allows the braking force to be applied to the front and rear wheels on the side opposite to the departure direction of the vehicle 1.

The braking controller 173 then controls the brake actuator 13 on the basis of the pressure command value (step S113). In the determination in the step S110, if it is determined that the motion state of the vehicle 1 does not correspond to the regular-use area of the braking apparatus, the pressure of the brake fluid according to the pressure command value is supplied to the wheel cylinders 122FL and 122RL respectively corresponding to the front left wheel 121FL and the rear left wheel 121FR, or to the wheel cylinders 122FR and 122RR respectively corresponding to the front right wheel 121FR and the rear right wheel 121RR. As a result, the yaw moment in the direction of avoiding the departure is applied to the vehicle 1 due to the braking force difference between the left and right wheels.

After the step S113, the LDA controller 172 may restart the lane departure preventing operation illustrated in FIG. 3 after a lapse of a predetermined period. At this time, the flag associated with the departure avoidance control is on, and thus, the lane departure preventing operation may be started while the yaw moment caused by the departure avoidance control is applied to the vehicle 1. In the determination in the step S106 performed again, if it is determined that there is the possibility that the vehicle 1 departs from the driving lane (the step S106: Yes), the process after the step S107 is performed. Thus, the application of the yaw moment caused by the departure avoidance control to the vehicle 1 is continued. On the other hand, in the determination in the step S106 performed again, if it is determined that there is no possibility that the vehicle 1 departs from the driving lane (the step S106: No), the flag associated with the departure avoidance control is turned off, and the application of the yaw moment caused by the departure avoidance control to the vehicle 1 is ended.

Figure 6:
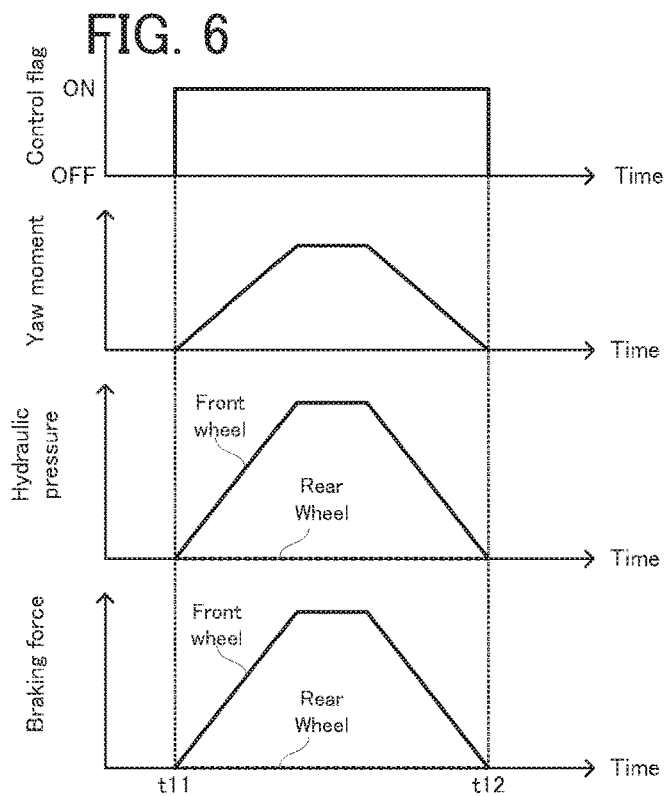
FIG. 6 is a diagram illustrating an example of a time change in each of a yaw moment, a hydraulic pressure, and a braking force by the lane departure preventing operation according to the embodiment.

The aforementioned lane departure preventing operation will be explained with reference to timing charts in FIG. 6 and FIG. 7. FIG. 6 is a timing chart when it is determined in the determination in the step S110 that the motion state of the vehicle 1 corresponds to the regular-use area of the braking apparatus. In the timing chart illustrated in FIG. 6, it is assumed that the control flag associated with the departure avoidance control is turned on at a time point t11 and the control flag is turned off at a time point t12.

As illustrated in FIG. 6, a hydraulic pressure (corresponding to the aforementioned "pressure of the brake fluid") is supplied only to the front wheel (i.e., the wheel cylinder 122FL or 122FR corresponding to the front wheel on the side opposite to the departure direction of the vehicle 1) and is not supplied to the rear wheel. As a result, the braking force is applied only to the front wheel.

Figure 7:
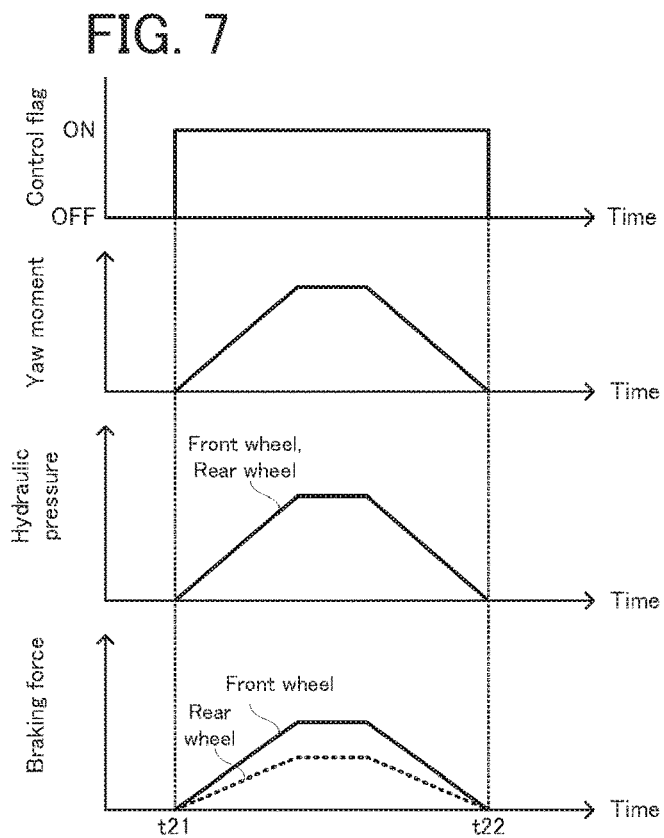
FIG. 7 is a diagram illustrating another example of the time change in each of the yaw moment, the hydraulic pressure, and the braking force by the lane departure preventing operation according to the embodiment.

On the other hand, FIG. 7 is a timing chart when it is determined in the determination in the step S110 that the motion state of the vehicle 1 does not correspond to the regular-use area of the braking apparatus. In the timing chart illustrated in FIG. 7, it is assumed that the control flag associated with the departure avoidance control is turned on at a time point t21 and the control flag is turned off at a time point t22.

As illustrated in FIG. 7, the hydraulic pressure is supplied to both the front and rear wheels (i.e., the wheel cylinders 122FL and 122RL or the wheel cylinders 122FR and 122RR respectively corresponding to the front and rear wheels on the side opposite to the departure direction of the vehicle 1). As a result, the braking force is applied to both the front and rear wheels.

(Technical Effect)

In the embodiment, the aforementioned departure avoidance control is performed when the vehicle 1 is about to depart from the driving lane. In the departure avoidance control, if the motion state of the vehicle 1 corresponds to the regular-use area of the braking apparatus, the braking force is applied only to the front wheel that is close to the brake actuator 13, out of the front and rear wheels on the side opposite to the departure direction of the vehicle 1. Thus, upon implementation of the departure avoidance control, the noise caused by the pressure transmitted in the brake pipe 113RL or 113RR, which is placed under the occupant compartment of the vehicle 1, is not generated.

If the regular-use area is defined, for example, as the range of the lateral velocity including 90% of all the frequencies out of all the frequencies in the distribution of the use frequency of the brake illustrated in FIG. 4, then, a possibility that the noise is caused by the pressure transmitted in the brake pipe 113RL or 113RR upon implementation of the departure avoidance control is reduced by 90% in comparison with a possibility in cases where the braking force is always applied to the front and rear wheels on the side opposite to the departure direction of the vehicle 1 upon implementation of the departure avoidance control. In other words, it is determined whether or not the motion state of the vehicle 1 corresponds to the regular-use area of the braking apparatus and it is determined whether the braking force is applied only to the front wheel out of the front and rear wheels on the side opposite to the departure direction of the vehicle 1 or is applied to both the front and rear wheels, by which it is possible to remarkably reduce the generation of the noise caused by the pressure transmitted in the brake pipe 113RL or 113RR upon implementation of the departure avoidance control.

Here, a degree of the departure of the vehicle 1 from the driving lane is expressed as a deviation amount of the future position of the vehicle 1, which is based on e.g., the velocity, lateral position, lateral velocity, or the like of the vehicle 1, from a virtual line corresponding to the center of the driving lane. If the motion state of the vehicle 1 corresponds to the regular-use area of the braking apparatus (i.e., the lateral velocity and/or departure angle of the vehicle 1 is relatively low or small), it can be said that the degree of the departure is relatively small.

In this case, a yaw moment for returning the vehicle 1 to the center of the driving lane by using the departure avoidance control (i.e., the target yaw moment) is relatively small. Thus, the yaw moment can be realized even without applying the braking force to both the front and rear wheels on the side opposite to the departure direction of the vehicle 1. In other words, in the departure avoidance control, if the motion state of the vehicle 1 corresponds to the regular-use area of the braking apparatus, it is possible to appropriately prevent the vehicle 1 from departing from the driving lane even without applying the braking force to both the front and rear wheels on the side opposite to the departure direction of the vehicle 1.

In the aforementioned embodiment, the brake actuator 13 is placed on the front wheel side of the vehicle 1; however, the brake actuator 13 may be placed on a rear wheel side of the vehicle 1. In this case, in the step S110 in FIG. 3, if it is determined that the motion state of the vehicle 1 corresponds to the regular-use area of the braking apparatus, the departure avoidance control performed is to apply the braking force only to the rear wheel that is close to the brake actuator, out of the front and rear wheels on the side opposite to the departure direction of the vehicle 1.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come within the meaning and range of equivalency of the claims are therefore intended to be embraced therein.

What is claimed is:

1. A deflection control apparatus of a vehicle including a braking apparatus, wherein the braking apparatus includes a plurality of brake mechanisms and a fluid pressure source, wherein the plurality of brake mechanisms are provided for corresponding wheels and are configured to apply braking forces to the corresponding wheels based on fluid pressures supplied to the plurality of brake mechanisms, and wherein the fluid pressure source can respectively supply the fluid pressures to the plurality of brake mechanisms, the deflection control apparatus comprising:
an electronic control unit (ECU) configured to:
determine whether the vehicle is about to depart from a driving lane on which the vehicle is currently running, based on a position of the vehicle In the driving lane and a motion state of the vehicle;
determine whether the motion state of the vehicle corresponds to a regular-use area of the braking apparatus, based on determining that the vehicle is about to depart from the driving lane;
control the braking apparatus to supply the fluid pressure to only the brake mechanism that is closer to the fluid pressure source, from among the brake mechanism corresponding to the front wheel on a side opposite to a departure direction of the vehicle and the brake mechanism corresponding to the rear wheel on the opposite side, based on determining that the motion state corresponds to the regular-use area of the braking apparatus, and
control the braking apparatus to supply the fluid pressure to either of the brake mechanism corresponding to the front wheel on the opposite side and the brake mechanism corresponding to the rear wheel on the opposite side, based on determining that the motion state does not correspond to the regular-use area of the braking apparatus.

2. The deflection control apparatus according to claim 1, wherein the ECU is configured to determine that the motion state corresponds to the regular-use area based on a lateral velocity of the vehicle, which is the motion state, being less than or equal to a first predetermined value.

3. The deflection control apparatus according to claim 1, wherein the ECU is configured to determine that the motion state corresponds to the regular-use area based on a departure angle of the vehicle, which is the motion state, being less than or equal to a second predetermined value, which varies depending on a velocity of the vehicle.

* * * * *